Jan. 19, 1926.
R. R. REED
1,570,004
DETECTIVE PHOTOGRAPHING SYSTEM
Filed Jan. 21, 1925    2 Sheets-Sheet 1
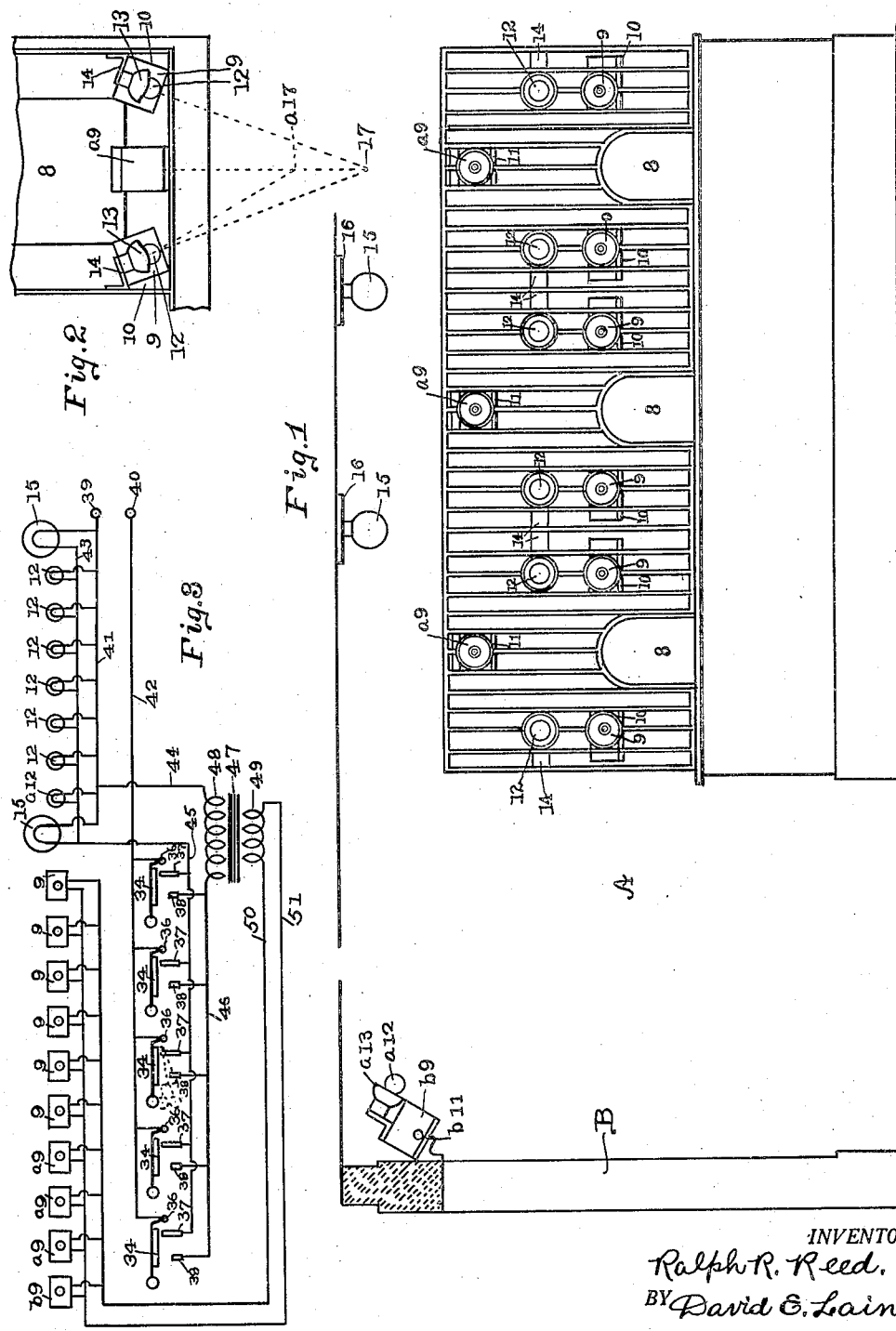
INVENTOR,
Ralph R. Reed.
BY David E. Lain,
ATTORNEY.

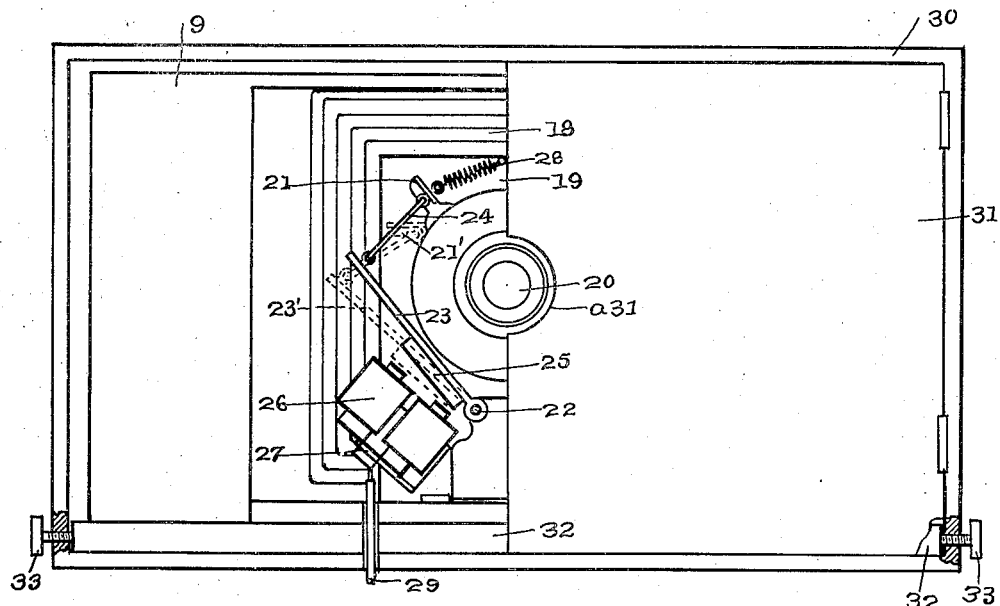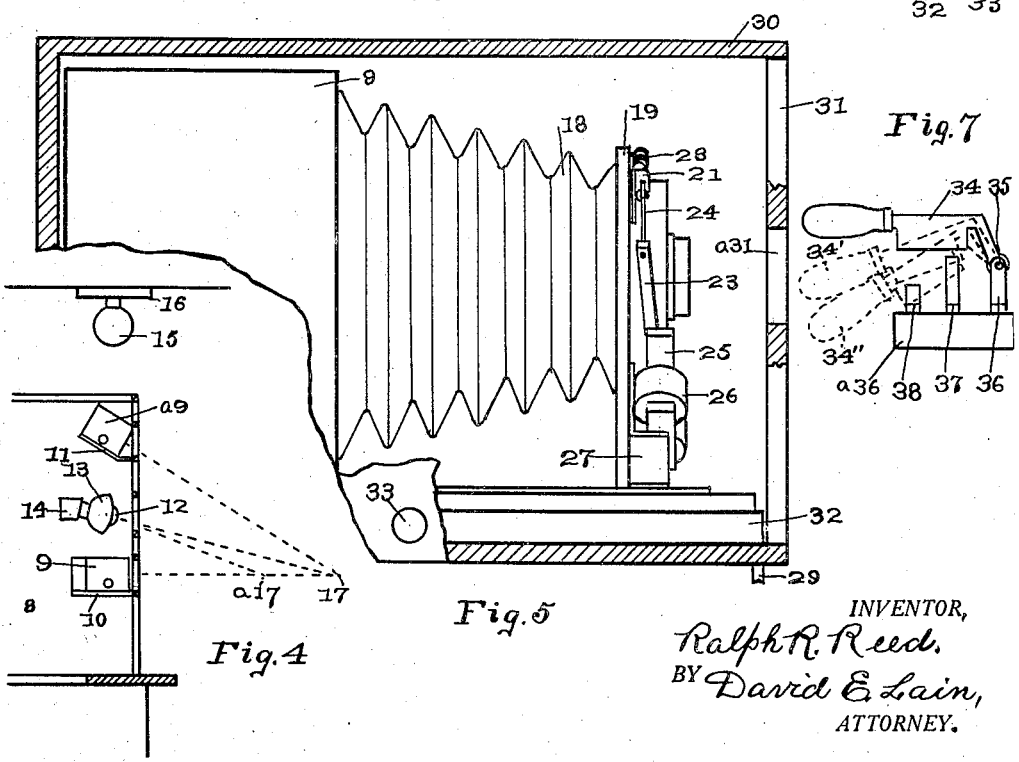

Patented Jan. 19, 1926.

1,570,004

UNITED STATES PATENT OFFICE.

RALPH R. REED, OF BELLINGHAM, WASHINGTON.

DETECTIVE PHOTOGRAPHING SYSTEM.

Application filed January 21, 1925. Serial No. 3,770.

*To all whom it may concern:*

Be it known that I, RALPH R. REED, a citizen of the United States, residing at Bellingham, in the county of Whatcom and State of Washington, have invented a new and useful Detective Photographing System, of which the following is a specification.

My invention relates to improvements in detective photographing systems for use in banking rooms, and the like, to take photographs of robbers in the act of looting said rooms, and one of the objects of my improvement is to provide a photographing system capable of being operated from several more or less distant places, another object of my improvement is to provide a photographing system capable of taking several simultaneous photographs of objects at each of several predetermined points, another object of my improvement is to provide a photographing system in which artificial illumination is supplied at said different points simultaneously and in advance of the exposure of the sensitive plates, and another object of my improvement is to provide simple and efficient apparatus which can remain out of use indefinitely without deterioration or expense and then be instantly employed when desired.

I attain these objects with the mechanism illustrated in the two sheets of drawings which accompany this application and form a part of the specification thereof in which Figure 1 is an interior view of a banking room, parts of which are broken away, showing the main entrance in sectional elevation and three paying tellers' cages in front elevation, Fig. 2 is a plan view of the front portion of one of said tellers' cages, Fig. 3 is the wiring diagram for the banking room, Fig. 4 is a side elevation of the upper front portion of one of said tellers' cages, Fig. 5 is a side elevation in section of a photographic camera with my device for operating the shutter electrically in place drawn on a larger scale, Fig. 6 is a front elevation of Fig. 5 and Fig. 7 is a side elevation of my special switch.

Similar characters refer to similar parts throughout, and certain parts are broken away to show others hidden thereby.

More particularly: Banking room A is assumed to contain the usual appurtenances found in such places, and entrance and exit from said room is provided by door opening B. The places where money is received and paid out more especially concern this invention and three tellers' cages are shown at 8, 8, 8. In the front grill work of said cages are several circular openings, five are shown in the front of each cage, one at the top center and two, one above the other, on each side of the window opening of each cage. A camera 9 is placed on a shelf 10 behind each of the two lower circular openings in each of said cage grills. Each pair of said cameras 9 in each cage are directed toward a point 17 near and in front of the cage window, see Figs. 2 and 4. Another camera $a^9$ is placed behind the central circular opening in said grill at the top thereof on shelf 11. Each of these upper cameras is directed forward and downward toward point 17 as shown in Figs. 2 and 4. Behind each of the upper side circular openings in the front grill of each cage is placed one of electric lamps 12 mounted in parabolic reflector 13 and fastened to the side of the cage by bracket 14. Over doorway B on bracket $b^{11}$ is fastened camera $b^9$ directed diagonally downward. And on top of camera $b^9$ is fastened parabolic mirror $a^{13}$ in which is mounted lamp $a^{12}$. Mirror $a^{13}$ is directed diagonally downward at the same angle as camera $b^9$. Powerful electric lamps 15. 15 are suspended beneath the ceiling of the banking room under hyperbolic mirrors 16, 16.

Referring to Figs. 5 and 6, camera 9 has bellows 18, slidable front board 19, shutter opening 20, and shutter trip 21. At 22 on front board 19 is pivoted keeper bar 23. Fastened to trip 21 and the free end of bar 23 by screweyes is link 24. Magnet keeper 25 is fastened beneath bar 23 for oscillation therewith. Pair of electro magnets 26 are fastened to front board 19 by bracket 27. Spiral spring 28 reacts between a pin in board 19 and shutter trip 21 and is strong enough to counterbalance the weight of bar 23 and keeper 25 thereon. Electric wires 29 connect magnets 26 with a source of electricity. Shutter trip 21 is oscillatable between its full-line position in Fig. 6 and its dotted-line position at 21' but is normally retained in its position at 21 by its spring, not shown, and by spring 28. When at position 21 shutter 20 is closed. When magnets 26 are actuated bar 23 is carried to its position at 23' by the attraction of said magnets for keeper 25 and trip 21 is thereby carried to its position at 21' thereby causing shutter 20 to momentarily open and then to close. Camera 9 is mounted on base board 32 which is retained in camera box 30 by set screws 33, 33.

In Fig. 7 my special knife switch is shown. Blade 34 is pivoted at 35 on switch block 36 fastened to switch base $a^{36}$. Taller switch contact plate 37 is nearer block 36 and shorter switch contact plate 38 is farther therefrom. When knife 34 is in its full-line position the circuits controlled by the switch are all open. When blade 34 is carried to 34' said blade is in contact with contact plate 37 and connection is established between block 36 and contact plate 37, but said switch blade does not contact with contact plate 38 and therefore no circuit is established therethrough. But when blade 34 is moved to its position at 34'' said blade contacts with plate 38 also and connection is established between switch block 36 and both of contact plates 37 and 38.

In the illustration of the several parts of the mechanism of my system which require an electric current for operation no attempt has been made to show the necessary electrical conductors between them. But in Fig. 3 a diagram of the wiring required to properly connect up the several of said parts is shown. In said figure each of the cameras and lamps are shown and also five switches similar to that illustrated in Fig. 7 and above described. The cameras and lamps are assumed to be placed as shown in Figs. 1, 2 and 4 while each cage is preferably provided with a switch and the others are placed in preferred locations in the banking room or even in other rooms if desired. Terminals 39 and 40 are assumed to be connected to the ordinary street alternating current service. Terminal 39 is connected to one terminal of each of the lamps by wire 41. The other terminals of said lamps are connected by wire 43 to each of switch contact plates 37, and terminal 40 is connected by wire 42 to each of switch blocks 36. Hence, when any one of switch blades 34 is carried to its dotted position at 36' said blade contacts with switch plate 37 and all of the lamps are illuminated. One of the wires of each of the cameras is connected to wire 50 which connects with one end of secondary coil 49 of converter 47 while the other end of said coil is connected by wire 51 to each of the other wires of said cameras. One end of primary coil 48 of converter 47 is connected by wires 44 and 41 to terminal 39 while the other end of said primary coil 48 is connected by wire 46 to each of switch plates 38. Hence, when switch blade 34 is carried to 34'' to contact with switch plate 38 converter 47 is energized and the current created in secondary coil 49 thereof energizes all of electro magnets 26 of said cameras simultaneously and all of the sensative plates in said cameras are exposed simultaneously and, after the usual treatment of these exposed photographic plates, photographs are obtained which disclose objects which were immediately in front of each teller's cage window and also which were near doorway B.

Inasmuch as these photographs must be taken within the room strong artificial illumination is required in order to secure well defined pictures with instantaneous exposure. The directing of the parabolic mirrors and cameras along similar lines, so that with a group of cameras focused on one point are a group of lamps with reflectors which strongly illuminate the vicinity of said point, will provide the necessary illumination. One of the objects of this invention is to bring the photographing devices into use only at such times as it is desired to obtain a photograph of a burglar who has presented himself in front of a teller's window and demanded that the money within reach be handed out to him. Such occurrences are, hopefully, rare, and my special apparatus will be used but rarely. At other times the special spot illumination would be objectionable. Therefore, both the special illumination and the plate exposures are held in reserve for the critical occasions. It may be that longer time is required to bring the lamps to a state of full illumination than is required to operate the camera shutters with the electro magnets. To make sure that the special illumination is fully on when the plate exposures are made I employ the special switch above described. It is assumed that the switch knife 34 will be forced to its limit of contact as rapidly as possible. But it must contact with plate 37 before it contacts with plate 38. This short difference in time between the closing of the lamp circuit and the closing of the camera magnets circuit will insure that the lamps are fully illuminated when the shutters are opened.

In addition to the spot illumination provided for in front of each teller's window and in front of the entrance a series of specially strong lamps with hyperbolic reflectors are hung from the ceiling. Two of these lamps are shown at 15, 15. While these lamps can be used in ordinary illumination by the provision of a proper switch, it is intended that they be of such brilliancy that their ordinary use would be objectionable.

It is thus apparent that my photographing system provides for the photographing of whoever may be at several predetermined locations in a room at one time by throwing any one or all of several switches which are scattered in different locations as desired.

As described above each group of cameras 9, 9, $a^9$ and lamps 12, 12 are directed and focused on point 17. This is assumed to be the place where the face of the burglar will be when he is "holding up" the cashier in one of the cages 8. Camera lenses are provided which will produce a picture sufficiently well defined for my purpose and yet allow for a range of several feet without adjustment of focus. But by employing several cameras for each cage, as disclosed, one of said cameras and one of said lights can be focused and directed on point $a^{17}$, as shown in Figs. 2 and 4. In other ways my system is susceptible of variations which will readily occur to those skilled in the art, and which form a part of this invention.

Having thus disclosed my invention, what I claim as new and desire to secure by Letters Patent is,—

In a detective photographing system in combination, a plurality of incandesent electric lamps located in a room, a plurality of electrically operable cameras located in said room and focused on desired locations, and a plurality of manual electric switches located at desired points each comprising two contact plates separately insulated one of said plates connected to the circuit of said lamps, and the other of said plates connected to the circuit of said cameras and an oscillatable switch blade adapted to first contact with said first plate and close the electric circuit through said lamps and then maintaining said contact make contact with said other plate and close the electric circuit through the electric mechanism of said cameras.

RALPH R. REED.